United States Patent [19]
Provost

[11] Patent Number: 5,887,320
[45] Date of Patent: Mar. 30, 1999

[54] FASTENER COMPONENT WITH FLEXIBLE FASTENER MEMBERS

[75] Inventor: George A. Provost, Litchfield, Mass.

[73] Assignee: Velcro Industries B.V., Curacao, Netherlands

[21] Appl. No.: 822,408

[22] Filed: Mar. 21, 1997

[51] Int. Cl.[6] .............................. A44B 21/00; A44B 18/00
[52] U.S. Cl. ................................................. 24/452; 24/442
[58] Field of Search ............................. 24/306, 442–452, 24/575–577

[56] References Cited

U.S. PATENT DOCUMENTS

| | | |
|---|---|---|
| 3,031,730 | 5/1962 | Morin . |
| 3,136,026 | 6/1964 | De Mestral . |
| 3,214,816 | 11/1965 | Mathison ............................. 24/452 X |
| 3,243,339 | 3/1966 | Scragg et al. . |
| 3,261,069 | 7/1966 | Mathison ................................. 24/450 |
| 3,278,152 | 10/1966 | Miller et al. . |
| 3,372,444 | 3/1968 | Mathison ............................. 24/452 X |
| 3,546,754 | 12/1970 | Erb ........................................ 24/452 X |
| 3,557,407 | 1/1971 | Lemelson . |
| 3,708,833 | 1/1973 | Ribich et al. ............................. 24/450 |
| 3,913,183 | 10/1975 | Brumlik ............................. 24/442 X |
| 4,706,914 | 11/1987 | Ground . |
| 4,709,453 | 12/1987 | Harvey et al. . |
| 4,725,221 | 2/1988 | Blanz ..................................... 425/575 |
| 4,775,310 | 10/1988 | Fischer .................................. 425/308 |
| 4,794,028 | 12/1988 | Fischer .................................. 428/100 |
| 4,872,243 | 10/1989 | Fischer .................................... 24/442 |
| 4,984,339 | 1/1991 | Provost et al. ........................... 24/452 |
| 5,058,247 | 10/1991 | Thomas et al. ........................... 24/448 |
| 5,116,563 | 5/1992 | Thomas et al. . |
| 5,300,058 | 4/1994 | Goulait et al. . |
| 5,315,740 | 5/1994 | Provost .................................... 24/452 |
| 5,325,569 | 7/1994 | Goulait et al. ....................... 24/452 X |
| 5,339,499 | 8/1994 | Kennedy et al. ........................ 24/452 |
| 5,505,747 | 4/1996 | Chesley et al. . |
| 5,604,963 | 2/1997 | Akeno ..................................... 24/452 |
| 5,620,769 | 4/1997 | Wessels et al. ...................... 24/452 X |
| 5,625,930 | 5/1997 | Takizawa et al. ........................ 24/452 |
| 5,669,120 | 9/1997 | Wessels et al. ...................... 24/452 X |

FOREIGN PATENT DOCUMENTS

WO 94/29070  12/1994  WIPO .

OTHER PUBLICATIONS

Fabrication Technology, Apr. 16, 1996.

*Primary Examiner*—Anthony Knight
*Assistant Examiner*—Robert J. Sandy
*Attorney, Agent, or Firm*—Fish & Richardson P.C.

[57] ABSTRACT

A fastener component comprises a field of loop-engaging elements each secured to a support. At least one of the elements has a molded, cantilever stem secured to the support at a base, projecting from the base at an acute angle to the support substantially linearly along a lengthwise axis to the region of a distal tip. The length of the projection upon the support of the portion of the cantilever stem beyond the base is between about 0.5 and 2.0 times the width of the base of the element, and the length of the projection upon the support of the portion of the stem between the tip and the point of its greatest spacing from the support is less than about 0.25 times the width of the base. The structure of the element can be useful for engaging very fine fibers that have low loft such as are found in inexpensive non-woven materials, due to minuscule motions of the head of the fastener element during engagement. Molds and methods for forming such fastener components are also disclosed.

25 Claims, 14 Drawing Sheets

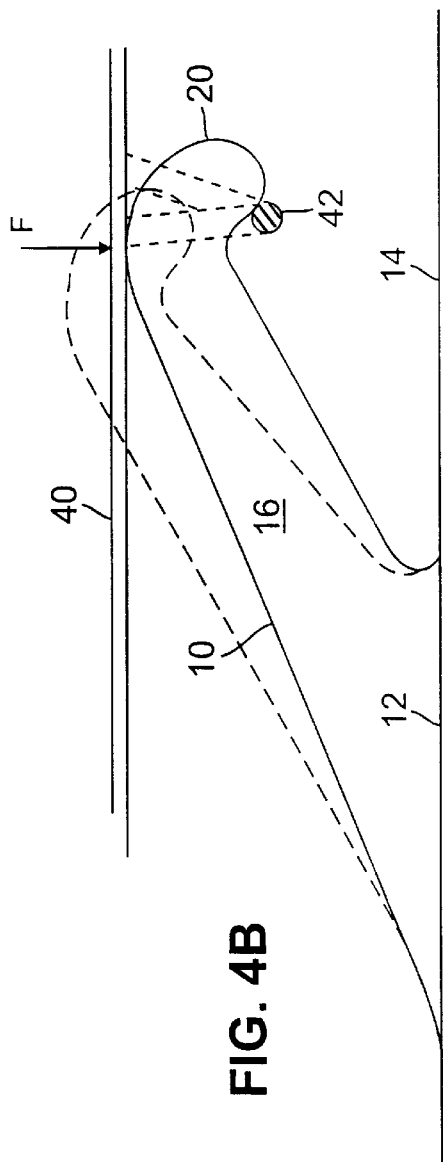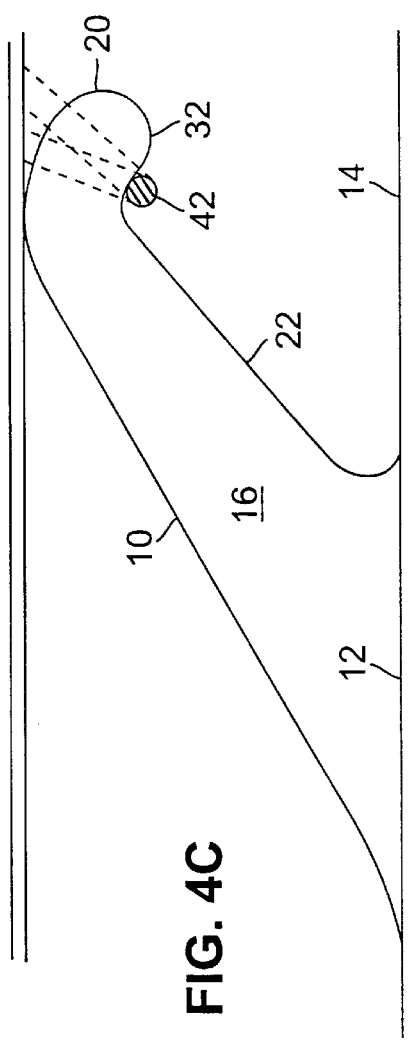

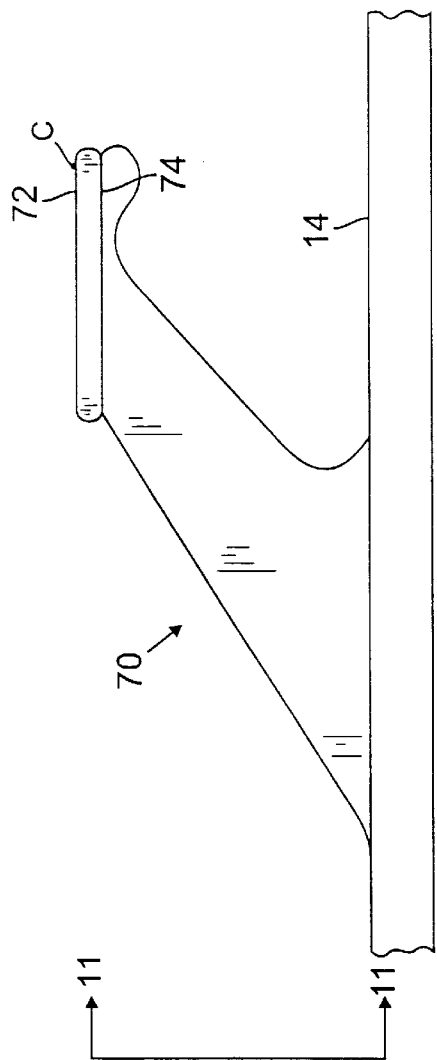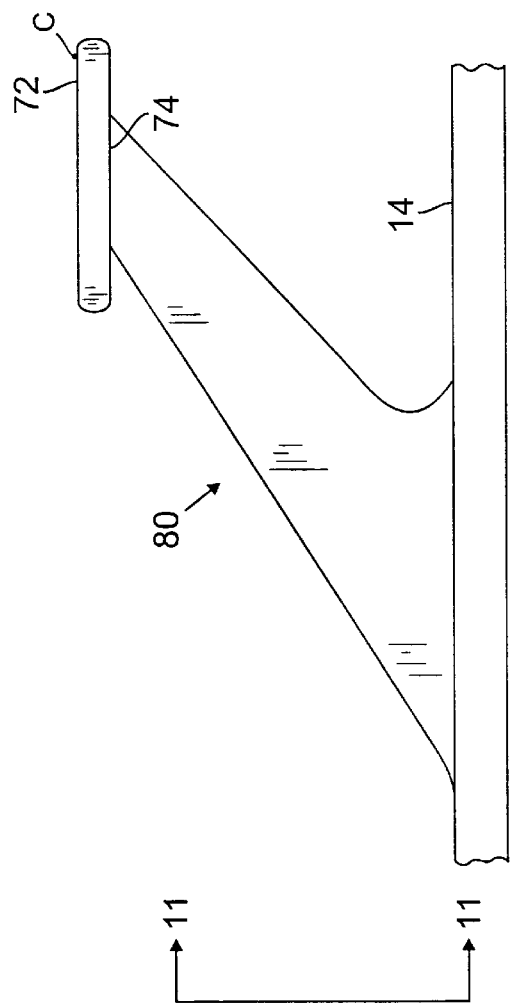
FIG. 9
FIG. 10

FASTENER COMPONENT WITH FLEXIBLE FASTENER MEMBERS

BACKGROUND OF THE INVENTION

This invention relates to fastener members useful for engaging low loft fabrics and the like.

In the field of molded hook fasteners, typically a series of adjacent rows of fastener members, such as single-sided hooks, form one side of a fastener, and a mating member provides loops or anchored fibers with which the fastener members engage.

The fastener members of a hook component typically are integrally formed with a base sheet and include a stem standing up from the base, and a tip attached to the stem and curving back toward the base.

The hook component is typically formed with a molding tool. Often the mold cavities have no moving parts and the fastener members are pulled from the mold cavities by resiliently distorting the fastener members. For molding a running strip of such fastener members, a rotating mold roll is employed. For discrete items, injection molding techniques are employed. Improvements applicable to such fastener members, as well as fastener members made in other ways, are desired for achieving economical and effective fasteners to address various fastening needs.

SUMMARY OF THE INVENTION

It is realized that for engaging very fine fibers or loops that have low loft such as are found in inexpensive non-wovens, e.g. spun bonded fabrics, that minuscule lateral motions of the head of a fastener element during engagement have a significant effect in enabling the fibers to be snagged by the fastener element and to be engaged.

According to the invention, these motions are enabled by a fastener element that is constructed with certain physical shapes that maximize these desired motions while maintaining desired strength properties.

According to one aspect of the invention, a fastener component includes a field of fiber-engaging elements each secured to a support. At least one of the elements has a molded, cantilever stem secured to the support at a base. The stem projects from the base, at an acute angle to the support, substantially linearly along a lengthwise axis to the region of a distal tip. The length of the projection upon the support of the portion of the cantilever stem extending beyond the base is between about 0.5 and 2.0 times the width of the base of the element.

In the presently preferred embodiment, the fastener component is of molded form, the stem having a thickness in the region of the tip less than the width of the stem in the region of the tip.

In some embodiments the acute angle is between about 30 degrees and 45 degrees, preferably between about 35 degrees and 40 degrees, and most preferably about 37 degrees.

In some embodiments, the length of the projection upon the support of the portion of the stem between the tip and the stem's point of greatest spacing from the support is less than about 0.25 times the width of the base.

In some embodiments the length of the projection is about equal to the width of the base.

In certain configurations the tip is formed as a crook. In some of these configurations the displacement volume of the crooked tip is less than about $6.0 \times 10^{-3}$ cubic inches. The crook preferably defines an included angle of between about 60° and 120°, most preferably about 90°.

In some other configurations the tip extends in the direction of the stem without forming a crook.

In the presently preferred embodiment the base has a width of between about 0.015 and 0.025 inch and the stem has a thickness at the base of between about 0.006 and 0.015 inch.

In some embodiments the stem has a thickness that gradually decreases away from the base. In some of these embodiments the stem has one broad, substantially flat side and one convex side. In other instances, the stem has two convex sides.

In some embodiments the field includes a row of elements, each row defining a spacing between adjacent elements along the row of more than about 1.5 times the width of the base of an element.

According to another aspect of the invention, a mold for integrally forming fastener elements on a sheet form base from a moldable resin is provided. The mold defines a field of element-shaped cavities extending from a surface, at least one of the cavities projecting from a base at the surface to a distal tip at an angle between about 30° and 45° with respect to the surface. The length of the projection upon the surface of the portion of the cavity beyond the base is between about 0.5 and 2.0 times the width of the base of the cavity. The length of the projection upon the surface of the portion of the cavity between the tip and the point of the cavity farthest from the surface is less than about 0.25 times the width of the base.

In some embodiments the cavity tip is in the shape of a crook.

In some embodiments the mold includes a plurality of plates stacked face-to-face, the cavities being defined along an edge of the stacked plates. In some instances the plates are circular with the cavities being defined about their circumferences. In some instances the mold is constructed to be suitable for use as an injection mold.

According to another aspect of the invention, a method for forming fastener elements on a sheet form base from a moldable resin is provided. The method includes:

(1) providing a mold as described above;
(2) delivering moldable resin to the surface such that the resin is forced into the cavities;
(3) solidifying the resin in the cavities to form fastener elements; and
(4) removing the fastener elements from the cavities.

It is realized that a downward deflection of the cantilever stem toward the supporting surface in the plane of the fastener element under an applied vertical load produces a desirable, lateral component of motion of the tip, parallel to the supporting surface, away from the base of the fastener element. In certain applications this motion can improve fiber engagement.

In certain preferred embodiments it is advantageous to form the fastener element with a tapering, non-symmetric thickness such that the tip of the element is offset toward one broad side of the stem such that downward loading on the tip of the hook, e.g. toward the supporting surface, also tends to produce a lateral component of motion of the tip in a direction perpendicular to the plane of the hook. This motion can also assist in the engagement and retention of fibers.

It is also realized that molded fastener hooks which can twist under relatively light transverse shear loads of a mating fabric can provide improved transverse shear resistance.

According to the invention, as the cantilever stems of the hooks twist, the tips of the hooks are turned and remain engaged with the loops.

In some embodiments, the tips of the cantilever stems are molded to form crooks. In other embodiments, the tips are not crook-shaped, but extend in the direction of the cantilever stems. Molded fastener members having flat upper plate portions, extending beyond the sides of the member, can also provide good engagement with low lying loops, and the plate portions can help to retain the loops under transverse shear loads.

BRIEF DESCRIPTION OF THE DRAWINGS

FIGS. 4A through 4C sequentially illustrate a loop-engaging motion of the fastener element;

FIGS. 9 and 10 are third and fourth embodiments of the fastener element of the invention, with flat upper plate portions;

DESCRIPTION OF THE PREFERRED EMBODIMENTS

Figure 1:
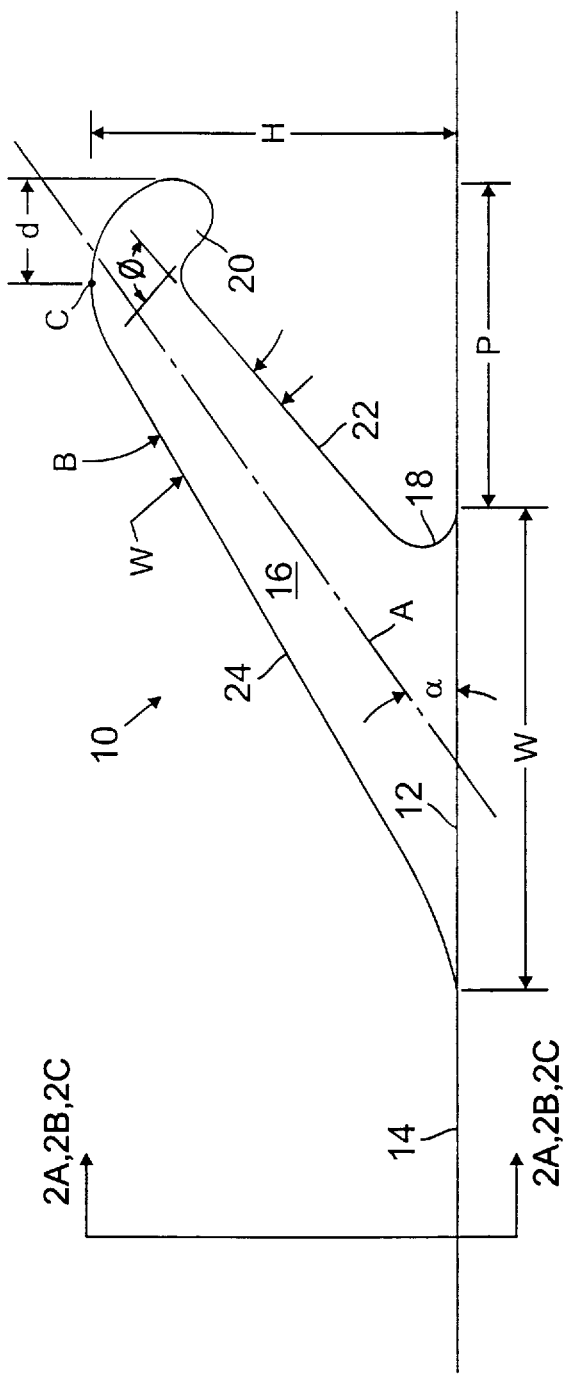
FIG. 1 is a side view of a fastener element, according to a first embodiment of the invention.

Referring to the embodiment of FIG. 1, fastener member 10 is a thin, molded hook member having a relatively wide base 12 integral with a support 14, and an extended cantilever stem 16 that projects from base 12 over the support. Stem 16 ends at a distal tip 20, that in this embodiment is molded to form a crook having an included angle $\phi$. Stem 16 is inclined with respect to support 14 such that its midline axis A forms an acute angle $\alpha$ with the support, and the width w of stem 16 tapers, decreasing in size from the base in the plane of the hook at an angle $\beta$ between relatively straight inner and outer surfaces 22 and 24, respectively. Inner surface 22 has an integral fillet 18 formed at base 12.

Preferably, as shown, angle $\alpha$ is about 37 degrees, while in other embodiments angles of between about 45 and 30 degrees are operable, to provide advantageous deflecting motions of stem 16 under certain load conditions.

Fastener member 10 is constructed such that the horizontal projection P of cantilever stem 16 upon support 14 beyond base 12 is about equal to the width W of base 12. The horizontal projection of the stem upon the support is such that the stem provides a good combination of loop engagement-enhancing properties under applied loads, as will be explained later. In presently preferred embodiments, height H of the fastener member above support 14 is about 0.025 inches or less, most preferably about 0.015 inches, and width W of base 12 is about 0.025 inches or less, most preferably about 0.015 inches.

The stem 16 projects beyond a point C of greatest spacing from support 14 a distance d of less than about one-fourth of the width W of base 12. In other words, the horizontal distance d from the forwardmost portion of tip 20 to point C is less than about 0.25 times W. This construction advantageously places the tip 20 proximate the portion of the fastener element that first makes contact with a loop member to improve the ability of tip 20 to engage a fiber.

Figure 2A:
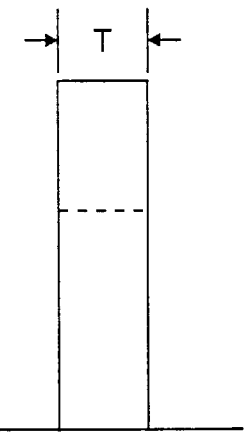
FIGS. 2A through 2C are end views of different versions of the fastener element, taken from direction A—A in FIG. 1.

Referring also to FIG. 2A, the thickness T of hook element 10 in a first specific embodiment of the profile of FIG. 1 is substantially constant along the length of the element and in a presently preferred configuration is about equal to the width $W_t$ of the tip of the element (FIG. 1). In another specific embodiment, illustrated in FIG. 2B, element 10 has a thickness that gradually decreases along the height of the element from a base thickness $T_{b1}$ at base 12, with one broad side 30 of the element being substantially flat. In this embodiment the thickness $T_{t1}$, of stem 16 at an elevation corresponding to the lowest part 32 of tip 20 is preferably about equal to one-half the width $W_t$ of the tip, and base thickness $T_{b1}$ is preferably about equal to width $W_t$. In yet another embodiment (FIG. 2C), both broad sides of the element are curved, with the thickness of the element tapering from a maximum of $T_{b2}$ at base 12. In this embodiment base thickness $T_{b2}$ is about equal to twice the width $W_t$ of the tip of the element and the thickness $T_{t2}$ of stem 16 at an elevation corresponding to lowest part 32 of tip 20 is preferably about equal to the width $W_t$ of the tip.

In certain preferred embodiments as shown in FIG. 1, tip 20 is angled down from stem 16, forming a hook in the region most remote from the base. To engage with loops or fibers having low loft, the hook has a displacement volume, as defined by Provost in U.S. Pat. No. 5,315,740, fully incorporated herein by reference, of less than about $6.0 \times 10^{-6}$ cubic inches, preferably less than about $6.0 \times 10^{-7}$ cubic inches.

Figure 3:
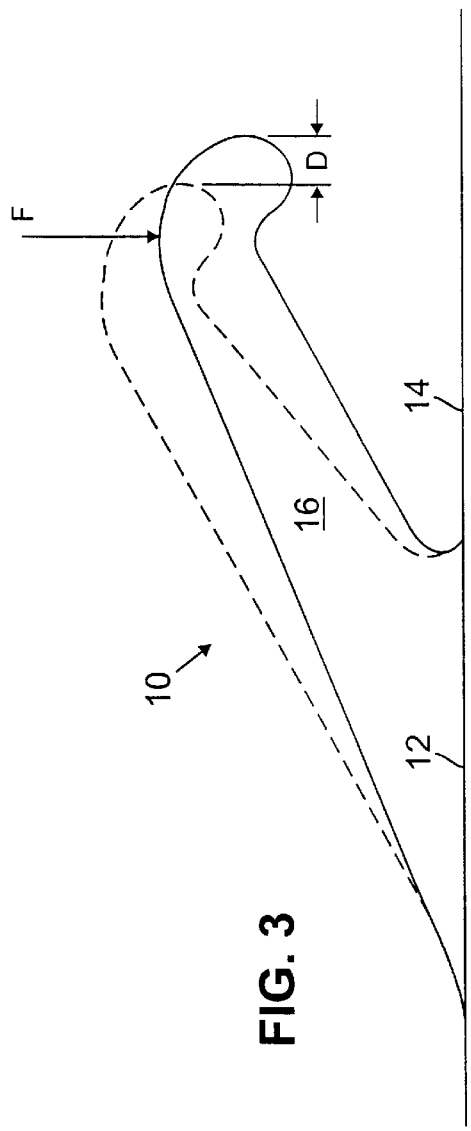
FIG. 3 illustrates a downward deflection of the fastener element under vertical load.

Referring to FIG. 3, extended stem 16 functions as a resilient cantilever stem which is deflected downward toward support 14 within the plane of the fastener element 10 when subjected to a downward force F. The profile of the undeflected fastener element is shown in the figure as a dashed line. The downward deflection of stem 16 advantageously causes tip 20 to have a lateral component of motion in the plane of the fastener element, displacing tip 20 forward a distance D in the plane of the fastener hook.

Figure 4A:
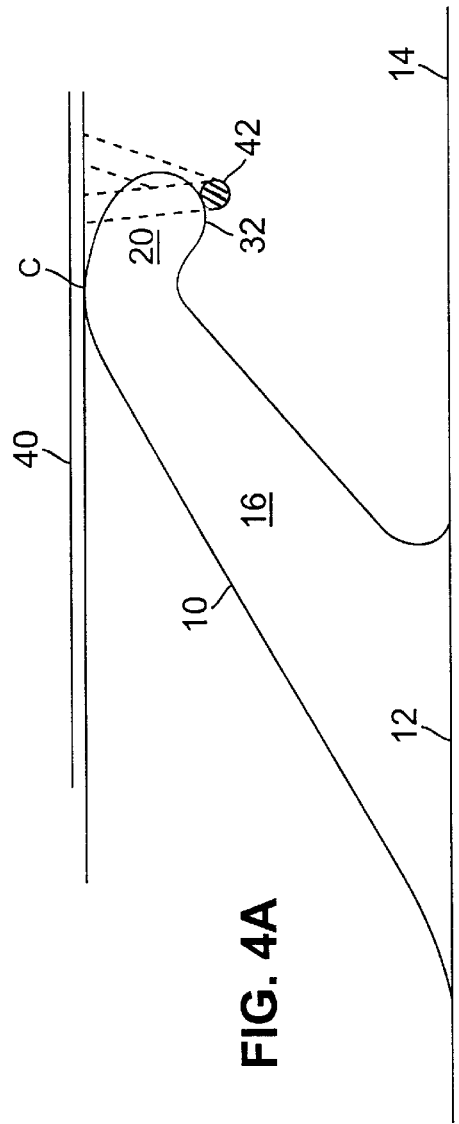

Referring to FIGS. 4A–4C, when fastener element 10, constructed according to the invention, is placed against a mating fabric 40 having many low-loft fiber loops, the forward motion of the tip of the fastener element helps fastener element 10 to engage a particular loop 42 when fabric 40 is pressed vertically downward against the fastener member. As fabric 40 first contacts the undeflected fastener member 10 near point C (FIG. 4A), loop 42 of the fabric lies slightly forward of the lowest part 32 of tip 20 of the fastener element, in a non-engaged position. Stem 16 functions as a cantilever arm when a downward force F is applied to element 10 near point C by fabric 40 (FIG. 4B), deflecting downward. As fabric 40 is pressed vertically downward against the fastener element, causing element 10 to deflect as described above, the forward, lateral component of motion of tip 20 moves the tip through loop 42 enough that loop 42 becomes engaged (FIG. 4B). When the engaging fastener element is unloaded (FIG. 4C), engaged loop 42 lies between inner surface 22 of stem 16 and the lowest part 32 of tip 20 of the fastener element.

Figure 4D:
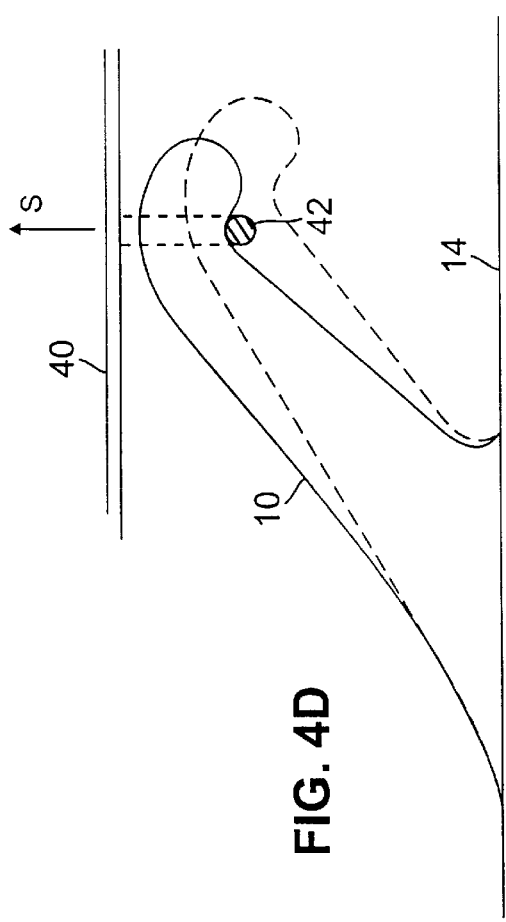
FIGS. 4D–4E show effects produced by certain loads on the element and engaged loop of FIG. 4C.
Figure 4E:
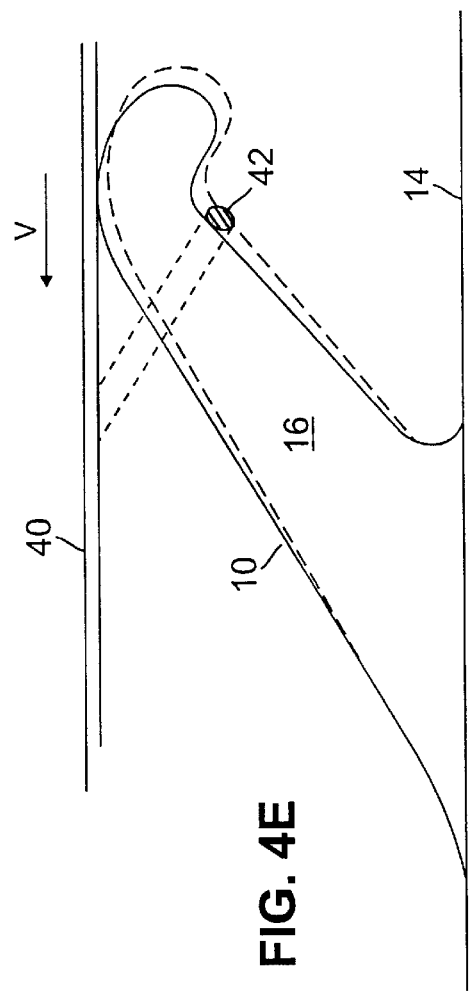

With loop 42 engaged, a vertical load S (FIG. 4D) acting to separate fabric 40 from fastener element 10, such as a peel load, causes the fastener element to deflect away from support 14 but, within a range of loadings, does not cause loop 42 to be disengaged. When subjected to a shear load V (FIG. 4E) in the direction of the plane of the fastener element 10, engaged loop 42 tends to move down stem 16, away from tip 20, toward a region of longer cross section of the stem, increasing the ability of fastener element 10 to resist the shear load without failure.

Figure 2B:
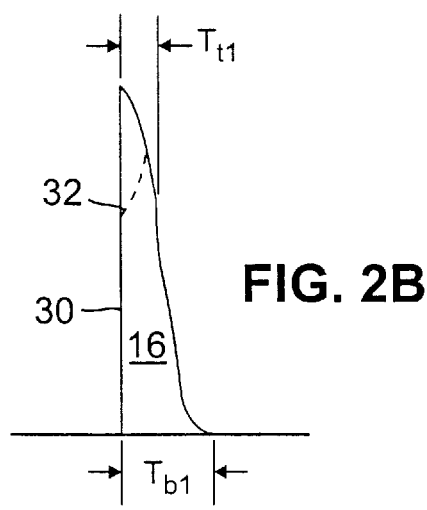
Figure 5:
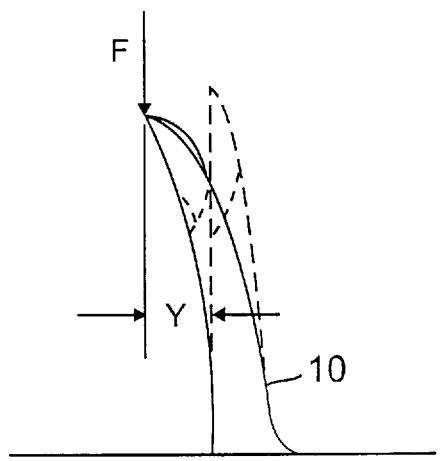
FIG. 5 illustrates a transverse deflection of the fastener element under vertical load.

Referring to FIG. 5, a downward force F similar to that shown in FIG. 3 deflects a fastener element 10, having a tapering thickness such as shown in FIG. 2B, in a direction transverse to the plane of the fastener element. The amount of transverse deflection Y is greatest at the top of the fastener element, and such deflection in a transverse direction is also advantageous for helping to engage low-lying loops, again because of the observation that slight lateral motion facilitates engagement with low lying loops.

Figure 6:
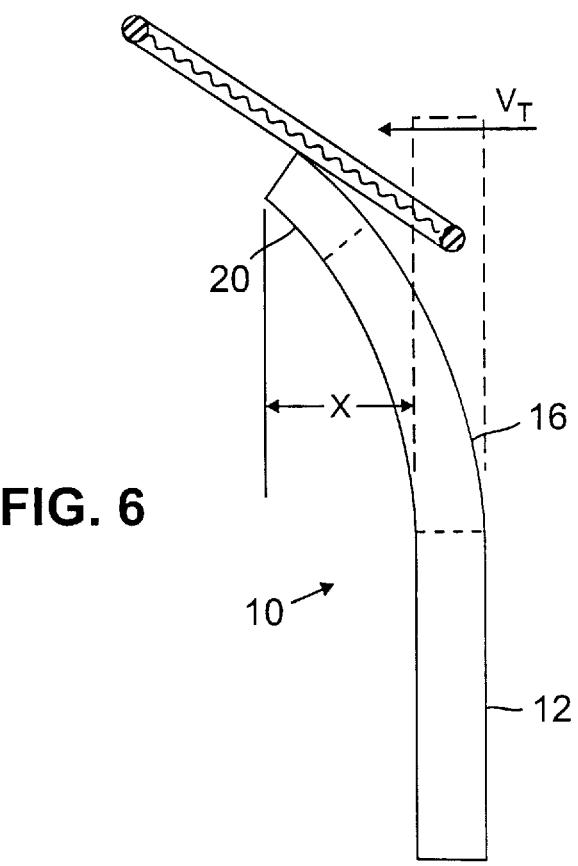
FIG. 6 is a plan view of the fastener element, illustrating a twisting of the fastener element under transverse shear load.

Referring to FIG. 6, a lateral load $V_T$ applied to fastening element 10 at tip 20 in a direction transverse to the plane of the fastening element by a loop 50 of a fabric causes tip 20 to be deflected out of the plane of the element a distance X. This twisting of the stem of the element causes the crooked tip to have a component of its aspect in the sideways direction corresponding to the direction of load and relative movement. This increases the incidence of engagement of the loops by the fastener members.

Figure 7A:
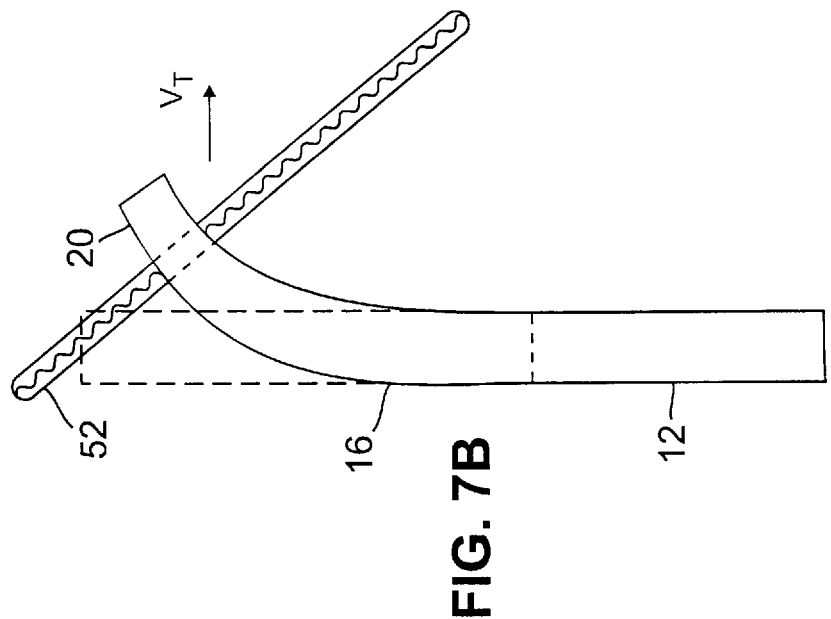
FIG. 7A is a plan view of the element with an engaged loop.
Figure 7B:
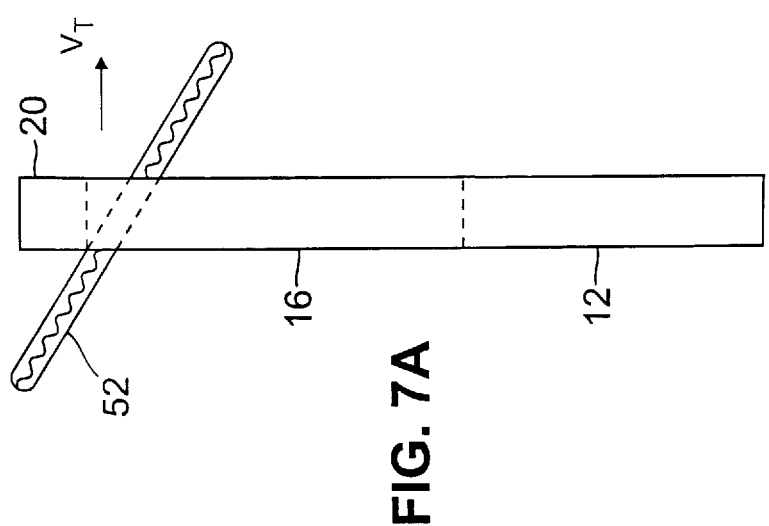
FIG. 7B illustrates the realignment of the tip of the fastener element of FIG. 7A under transverse shear load applied by the engaged loop.

Referring to FIGS. 7A and 7B, the form and structure of stem 16 enables it to similarly act as a bendable cantilever when tip 20 is loaded in a direction substantially perpendicular to the row of fastener members by an obliquely engaged loop 52 of a fabric. In a relaxed state (FIG. 7A), loop 52 is in an engaged position between tip 20 and the support of the fastener component. When the engaged loop applies a transverse load, stem 16 resiliently twists to the position shown in FIG. 7B, enabling tip 20 to be advantageously aligned across loop 52 to maintain the engagement. In this way, an engaged loop of fabric is more securely held against transverse shear loads.

The advantageous loop-engaging and loop-retaining motions of fastener element 10 illustrated in FIGS. 3–7B are enabled in part by the cantilever structure of the fastener element. The ratio of projection P to base width W of between about 0.5 and 2.0, for example, enables a useful amount of stem deflection during loop engagement, as illustrated in FIGS. 4A–4C, while providing sufficient stiffness to resist loop-releasing deflections and loads, as illustrated in FIGS. 4D–4E. Fastener elements with projections much longer than twice the width of the base can be unable to sufficiently resist the bending loads applied by an engaged loop to retain the loop. Fastener elements with projections much less than about half the width of the base can be too stiff to provide the advantageous deflections heretofore described.

Figure 2C:
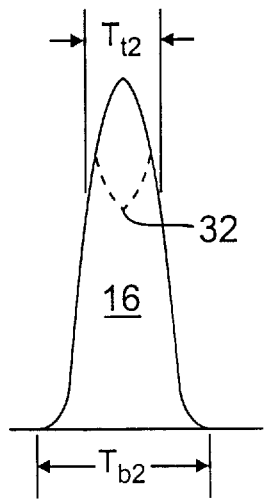
Figure 8:
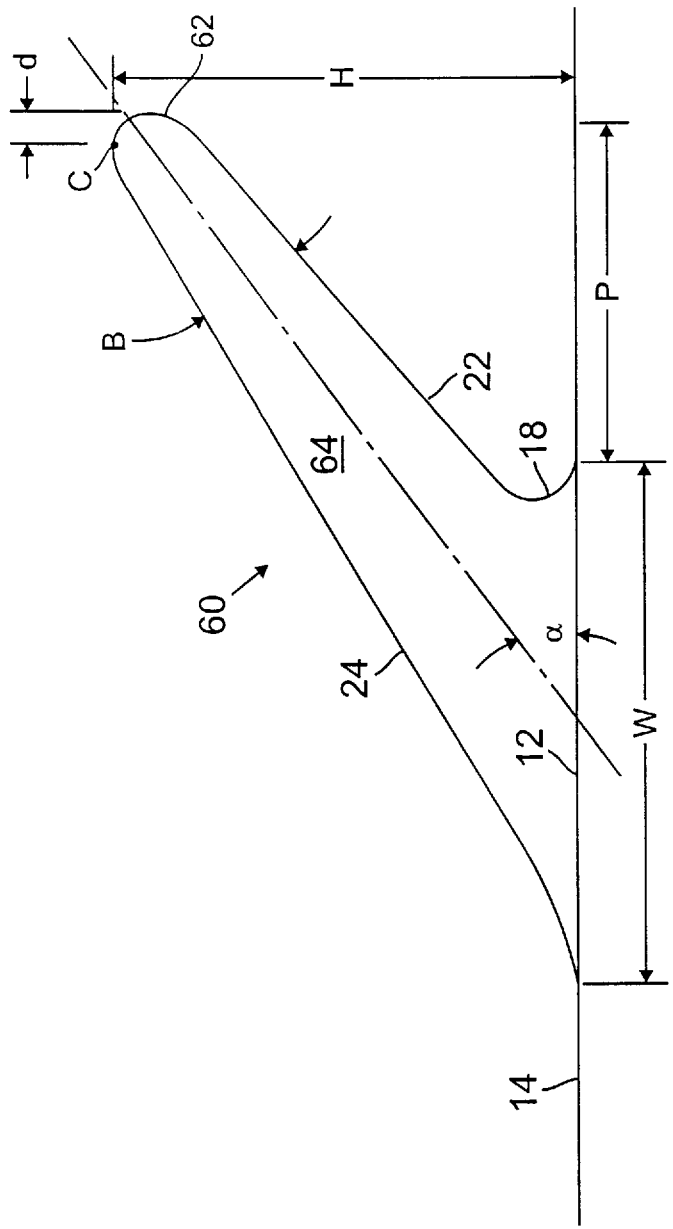
FIG. 8 is a side view of a fastener element, according to a second embodiment of the invention.

Referring to FIG. 8, in another embodiment a fastener element 60 has all of the structure and properties of element 10 of FIG. 1, with the exception that the tip 62 of the stem 64 extends straight, such that the tip of element 60 is not hook-shaped to form a crook. Element 60 is also formed, in various embodiments, to have either a constant thickness or a tapering thickness, as illustrated in FIGS. 2A through 2C, and advantageously deflects in a similar manner as the hook-shaped element 10 to shear loads, e.g. loads V and $V_T$ in FIGS. 4E and 6, respectively, and to vertical loads, e.g. load F in FIGS. 3 and 4B. In addition, the lack of a hooked tip particularly enables element 60 to advantageously penetrate a fabric having low-lying loops under certain conditions, the tip of the element being able to laterally displace nearby loops during penetration due in part to its small frontal area and small forward tip projection d. Such fasteners are useful under conditions of constant loads that have a load component along the stem of element directed toward the base. In one embodiment the fastener is mounted upon an elastic member that, on application, remains continuously in a stretched condition, supplying such constant loads.

FIGS. 9 and 10 depict advantageous third and fourth embodiments, respectively, in which fastener members 70 and 80 have upper plate portions 72. Members 70 and 80 are formed by passing fastener members 10 and 60 of the first and second embodiments, respectively, beneath a heated surface in a post-molding operation to form flat plate portions 72 at the top of the elements. The plate portion contributes to making fastener members 70 and 80 particularly useful for engaging the loops of non-woven fabrics in general and, in particular, the low-loft non-woven fibers desired to be used on disposable diapers. In these embodiments the portion C of the fastening element having greatest perpendicular distance from support 14, and therefore tending to contact a mating loop fabric first, is the upper surface of plate portion 72. The construction of plate portion 72 is such that its forwardmost part is proximate the tip of element 70 or 80, increasing the ability of their respective tips to engage loops.

Figure 11:
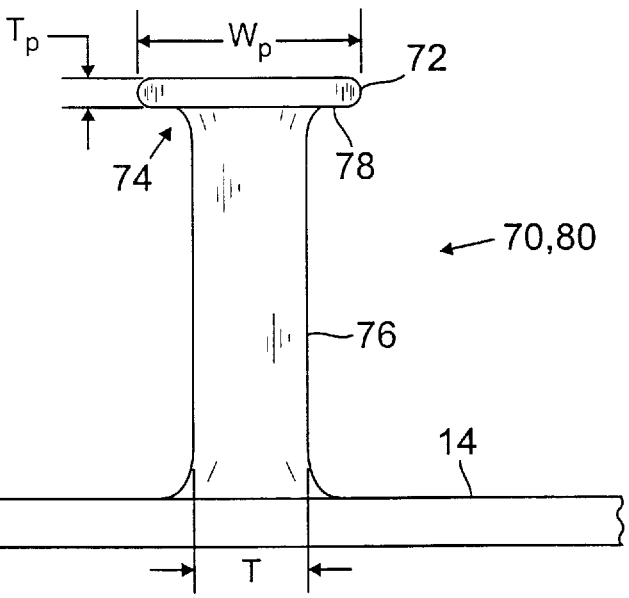
FIG. 11 is an end view of the fastener element of either FIG. 9 or FIG. 10, taken from direction B—B.
Figure 12:
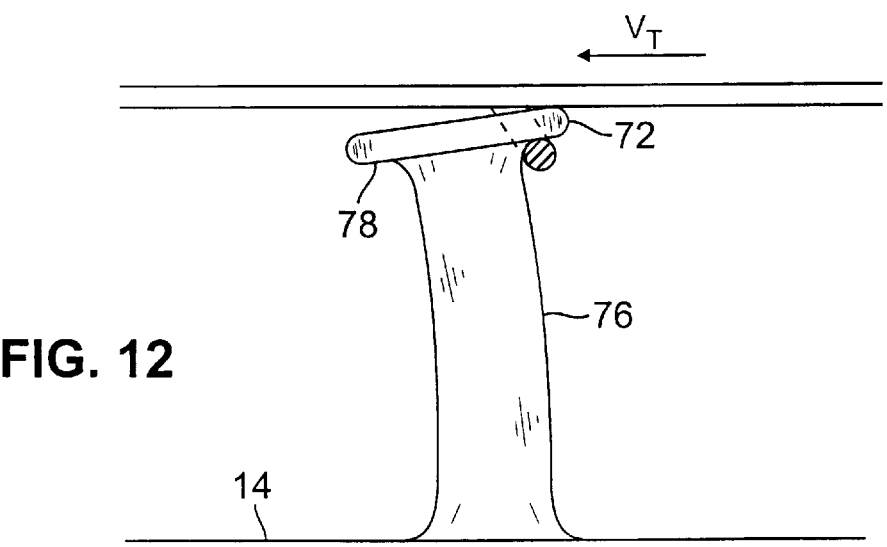
FIG. 12 illustrates the element of FIG. 11 engaging a fiber loop with very low loft.

Referring to FIG. 11, the intersection 74 of the stem 76 of either element 70 or 80 and the plate portion 72 defines a fiber-engaging hook that is not re-entrant. This enables the overhang 78 of plate portion 72, e.g. the part overhanging the sides of stem 76, to slide under a loop 90 with extremely low-lying loft, as shown in FIG. 12.

Depending upon the conditions of use, it is advantageous for the depth of overhang 78 to fall within the range of 5 to 50% of the thickness T of the base of the stem of the fastener element. In certain preferred instances, the overhang depth is about 25% of stem thickness T. Thus, in preferred cases the width $W_p$ of plate portion 72 is approximately 1.5 to 2.0 times stem thickness T, and the vertical thickness $T_p$ of plate portion 72 is between about 0.2 and 0.4 times stem thickness T. The lengthwise dimension of the plate portion, in general, will be somewhat longer than the widthwise dimension, and it is generally allowed to be whatever dimension results from thermoforming the plate portion sufficiently to obtain the desired plate width $W_p$ and the desired overall fastener element height. The thickness $T_p$ of one plate was 0.002 inch and the plate width $W_p$ was 0.013 inch. For engaging loops with cross-sections of about 0.001 inch in diameter, a preferred range for $T_p$ is about 0.001 to 0.005 inch. Other embodiments (not shown) have "flat-topped" elements formed by similarly post-forming plate portions on preform elements having tapering thicknesses as shown in FIGS. 2B and 2C.

Figure 13:
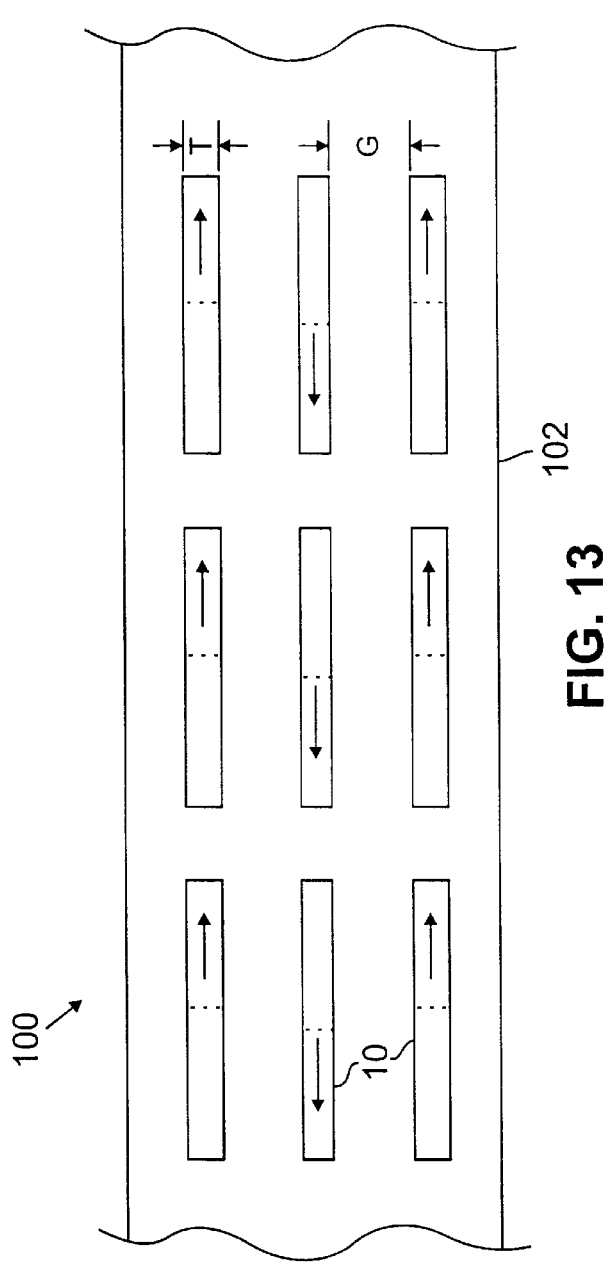
FIGS. 13 and 14 are plan and side views, respectfully, of a fastener component with an array of the fastener elements of FIG. 1.
Figure 14:
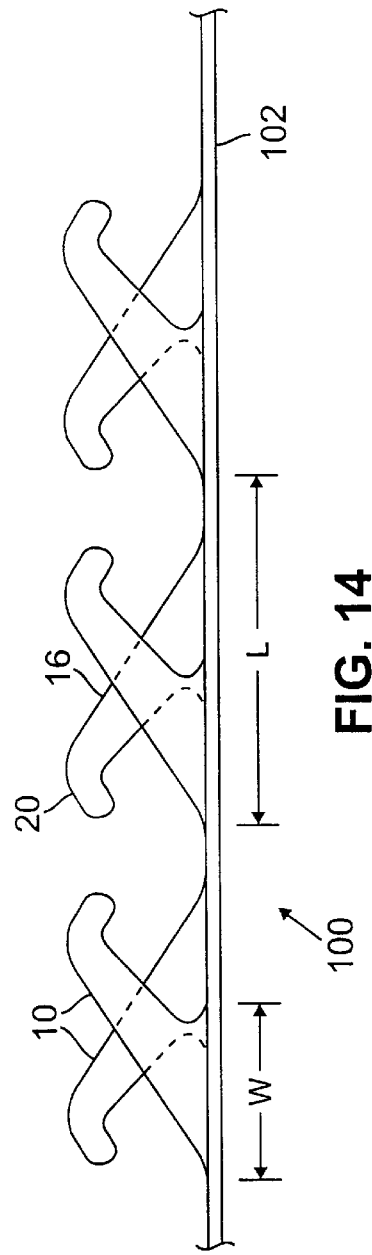
Figure 15:
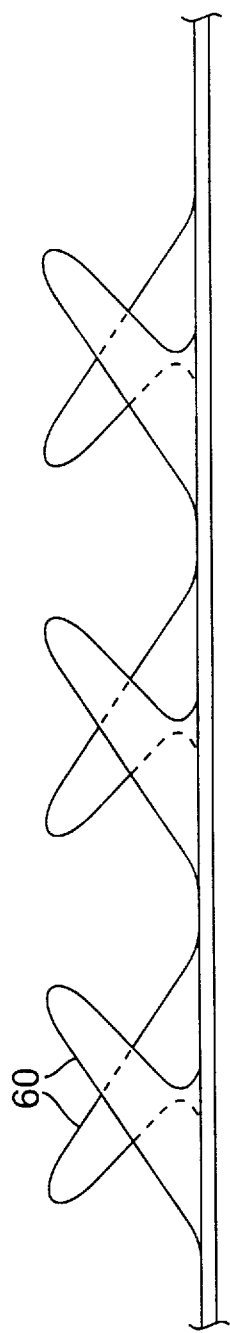
FIG. 15 is a side view of a fastener component with an array of the fastener elements of FIG. 8.
Figure 16:
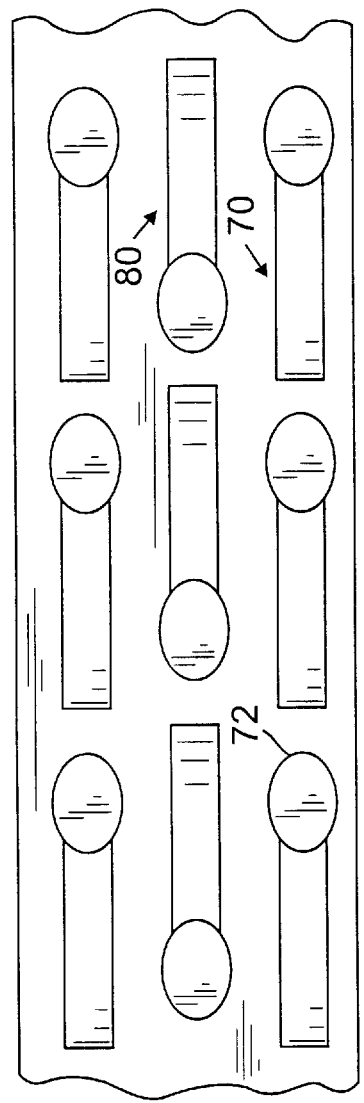
FIG. 16 is a plan view of a fastener component with an array of the fastener elements of either FIG. 9 or FIG. 10.
Figure 17:
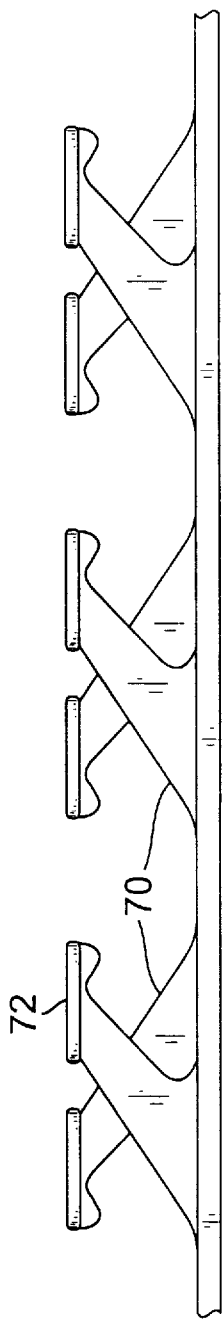
FIG. 17 is a side view of a fastener component with an array of the fastener elements of FIG. 9.
Figure 18:
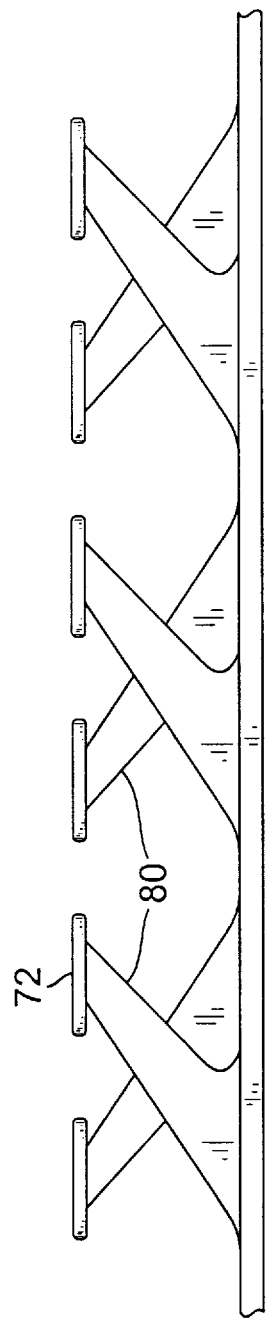
FIG. 18 is a side view of a fastener component with an array of the fastener elements of FIG. 10.

Referring to FIGS. 13 and 14, a hook component 100 of a hook and loop fastener consists of a base sheet 102 and several rows of fastener elements 10 extending from the base sheet. Although only three rows are shown for illustration, it is to be understood that component 100 may have any number of rows. As shown, the fastener members in adjacent rows preferably face in opposite directions. Alternatively, the fastener members may face in the same direction, or have other orientations. Ripstop bumps (not shown), i.e., raised local regions of the base in the spaces between rows of fastener members, may be employed either aligned with the fastener members or offset from the fastener members, depending on the intended application. Fastener members 10 preferably have a base thickness T of about 0.006 inch, and adjacent rows of members are separated by a distance G of about 0.008 inch. Adjacent fastener elements in a row are preferably spaced along the row a distance L of at least 1.5 times the base width W of one of the fasteners, such that the tip of a first element will not contact the back surface of a second, adjacent element in the row when the stem of the first element is deflected downward by a given vertical load. In a preferred embodiment, there are about 24 fastener elements 10 per lineal inch in each row. As shown in FIGS. 15 through 18, similar hook components may have fastener elements 60, 70 or 80, and yet other embodiments may employ an advantageous combination of these and other fastener element shapes to provide desired properties.

Figure 19:
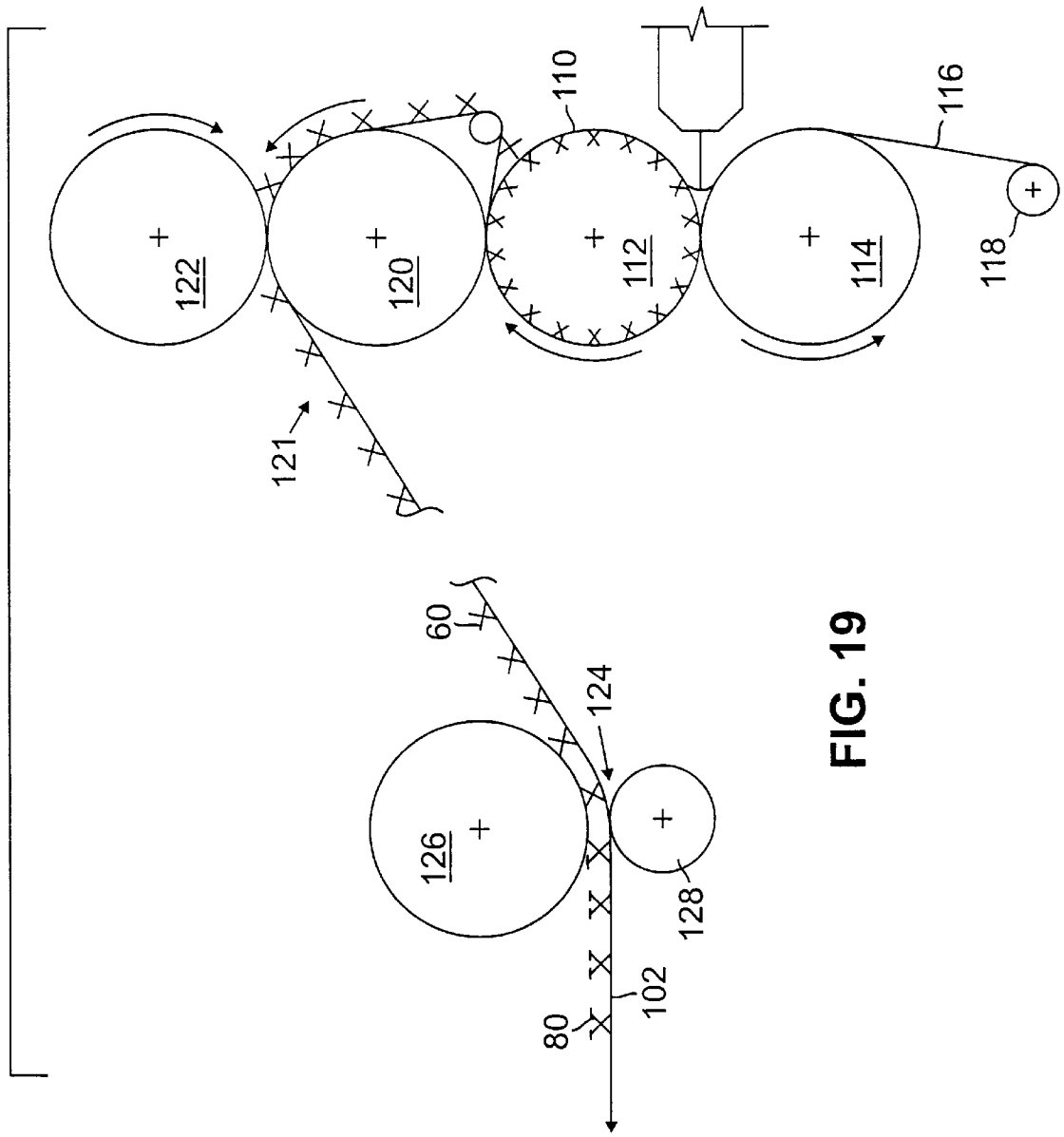
FIG. 19 is a schematic representation of a molding apparatus and method for forming a fastener product according to the invention.

Referring to FIG. 19, the hook component 100, including fastener members of any of the embodiments presented, is advantageously formed using the Fischer process, U.S. Pat. No. 4,794,028, fully incorporated herein by reference, in which mold cavities 110 for rows of fastener members are formed in the peripheries of corresponding disk-form mold plates of a mold roll 112, the plates being stacked alternately with optional spacer plates that form any flat sides of the fastener members, in some instances with formations of bumps formed in the spacer plates that can add strength to the hook component 100.

A molten resin is continuously extruded into the nip formed between the cooled mold roll 112 and a pressure roll 114. Mold roll 50 has mold cavities 110 about its periphery that are configured to produce fastener members 10 or 30, as described. If necessary to make the height of the molded fastener elements more uniform, the molded tape 121 may be passed between a wrap-around roller 120 and a knock-down roller 122 while the fastener elements are still soft and permanently deformable. Knock-down roller 122 pushes any higher, steeper fastener elements down to a uniform, desired height. In some instances a backing sheet 116, such as a woven or non-woven fabric, is supplied from a backing sheet roll 118 to the nip, such that the resulting hook component includes fastener members bound to backing sheet 116 in what may be termed an in situ laminating process. This backing sheet may contain loops adapted to engage the fastener members.

To form outer plate portions 72 of fastener members 70 and 80, molded tape 121 of fastener elements 10 and 60, respectively, is passed through gap 124 between a thermo-forming heated roller 126 and a support roller 128 after the preform fastener elements have cooled sufficiently to be strong enough to withstand some pressure without being deformed. The width of gap 124 is adjustable, and roller 126 is heated to a selected temperature sufficient to thermally reform the elements. Thus, as the preform fastener elements come into contact with the heated thermo-forming roller 126, their outer ends are thermo-formed by the action of the rollers to provide the disk-shaped plate portions 72 of the fastener elements 70 and 80.

The selected temperature of roller 126 depends upon the thermal properties of the particular resin being used to make the fastener member and the selected speed of operation. Presently, the shell material of disposable diapers is often polypropylene. In certain applications, nylon or other materials would also be appropriate. To ensure good bonding when the fastener component 100 is attached to the diaper, the fastener component is also preferably made from polypropylene. In this case, roller 126 is heated to a surface temperature of approximately 350° Fahrenheit, and has operated in a demonstration line at a lineal speed of approximately 11 feet per minute. (Much higher speeds will be used in production.) The preform fastener elements approach roller 126 nearly tangentially. This results in a temperature at the surface of the fastener element which is approximately the same as the melt temperature of the polypropylene resin, and causes the end of the preform to be softened to the point of being permanently deformable under pressure, without being melted to a highly fluid state.

In order for plate portions 72 to be substantially parallel to the base sheet 102 of fastener component 100, it is preferred that heated roller 126 and support roller 128 rotate at speeds such that their tangential surface velocities substantially match the feed rate of fastener tape 121. Otherwise, the plate portions will be dragged by, or will drag along, the heated roller and be deformed.

In certain instances it is desirable to form outer plate portions 72 on only some of the fastener element preforms. This can be achieved, for example, by not passing the fastener elements under the knock-down roller 122. Thus, because the fastener elements have different heights from the base sheet, passing the fastener elements through gap 124 between the heated roller 126 and support roller 128 will form disk-shaped plate portions 72 on only those fastener elements which extend furthest from base sheet 102. For some applications, having some of the fastener elements possess disk-shaped plate portions 72 and others not possess the plate portions provides for a more satisfactory balance of fastening properties (such as a desired balance of peel and shear properties). In other embodiments the fastener elements are formed to have different heights by using mold cavities 110 having different depths. Molding the fastener elements to have different heights from the base sheet in some instances allows greater control over the percentage of elements that are "flat-topped." It is possible to mold fastener elements with two, three or more different heights from the base sheet.

In another arrangement to "flat-top" only some of the fastener elements of a hook component, the surface of heated roller 126 may have a multitude of circumferential grooves that allow some of the rows of the fastener elements to pass without being deformed while selectively "flat-topping" other rows.

It will be appreciated that moldable resin can be delivered to mold cavities 110 in numerous ways. For example, the moldable resin can be delivered to mold roll 112 directly from an extruder. After traveling along the surface of the mold roll, the resin can be then pressed into the mold cavities using a pressure roller. In other cases, the extruder can be mounted to extrude with pressure against the roll surface, with extensions of the nozzle surface that conform to roll 112 serving to keep the extruded resin at sufficient pressure to enable mold cavities 110 to fill with resin.

Moldable resin may also be injected into mold cavities, thereby forming the fastener elements by injection molding. Injection molding can be employed to form the fastener members directly on a rigid backing which, in turn, can be attached to a separate product (not shown). Injection molding can also be employed to form the fastener members integrally with a product, such that the fastener members do not need to be subsequently attached to the product.

In some instances it is preferable to mold stems with the support and subsequently form tips on the stems.

The moldable resin may be any plastic material depending on the intended application for the fastener element. Currently, polypropylene is preferred. Nylon, polyesters, polyethylene, propylene, ethylene and copolymers thereof, or other thermoplastic resins may also be readily employed.

It is, of course, foreseeable that other plastics are formable to produce the flat-top fastener elements 70 and 80. The material selected for these fastener shapes preferably has a relatively low melt flow index, which is a measure of the viscosity of the resin when it is molten. Resins with fractional melt flow indices, i.e., indices that are less than 1.0, are most preferred, although under certain circumstances and fastener element designs, resins with melt flow indices as high as 5.0 or 10.0, or even higher, can be created by careful balancing of the steps of the process. Referring back to FIG. 19, the temperature of roller 126 and the lineal speed of fastener tape 121 are selected to raise the temperature of the surface of the fastener to a value which renders the selected resin desirably moldable. For polypropylene, as noted above, it was found that 350° Fahrenheit was appropriate. Further, additional support rollers and the like may be employed to increase the arc of roller 126 which the preforms contact, thereby increasing the heating time for a given tape speed.

The width of gap 124 between thermo-forming roller 126 and support roller 128 is adjusted to obtain the appropriate height of fastener elements 70 and 80. With regard to the amount by which the tops of the hook-shaped elements 70 are thermo-formed, it is important that the outer ends not be deformed so much as to impair the geometry of the crook portion or the ability to the fastener element to engage and retain fibers of a loop member.

To form mold cavities 110 that are appropriately shaped to mold fastener elements with tapering thickness, e.g. as shown in FIGS. 2B and 2C, photo-chemical etching techniques may be advantageously employed. Mold cavities 110 for forming fastener elements with parallel broad sides, e.g. as shown in FIG. 2A, are preferably formed in mold plates using wire EDM techniques.

What is claimed is:

1. A fastener component comprising a field of fiber-engaging elements each secured to a support, at least one of the elements comprising a molded, cantilever stem secured to said support at a base, the stem projecting from the base, at an acute angle between about 30 degrees and 45 degrees to the support, substantially linearly along a lengthwise axis to the region of a distal tip formed as a crook, the length of the projection upon said support of the portion of said cantilever stem extending beyond said base being between about 0.5 and 2.0 times the width of the base of the element;

the stem having a point of greatest spacing from said support, the length of the projection upon said support of the distal portion of said stem, beyond said point of greatest spacing, being less than about 0.25 times the width of said base.

2. The fastener component of claim 1 of molded form, the stem having a thickness in the region of the tip less than the width of the stem in the region of the tip.

3. The fastener component of claim 1 wherein said acute angle is between about 35 degrees and 40 degrees.

4. The fastener component of claim 3 wherein said acute angle is about 37 degrees.

5. The fastener component of claim 1 wherein the length of said projection is about equal to the width of the base.

6. The fastener component of claim 1 wherein the displacement volume of the crooked tip is less than about $6.0 \times 10^{-3}$ cubic inches.

7. The fastener component of claim 1 wherein the crook defines an included angle of between about 60° and 120°.

8. The fastener component of claim 7 wherein said included angle is about 90°.

9. The fastener component of claim 1 wherein the base has a width of between about 0.015 and 0.025 inch.

10. The fastener component of claim 9 wherein the stem has a thickness at the base of between about 0.006 and 0.015 inch.

11. The fastener component of claim 1 wherein the stem has a thickness that gradually decreases away from the base.

12. The fastener component of claim 11 wherein the stem has one broad, substantially flat side and one convex side.

13. The fastener component of claim 11 wherein the stem has two convex sides.

14. The fastener component of claim 1 wherein the field comprises a row of said elements, the row defining a spacing between adjacent elements along the row of more than about 1.5 times the width of the base of a said element.

15. A fastener component comprising a field of fiber-engaging elements each secured to a support, at least one of the elements comprising a molded, cantilever stem secured to said support at a base and terminating at its most remote region as a distal, crooked tip, extending at an angle of between about 30° and 45° to said support and tapering away from the support, the length of the projection upon said support of the portion of said cantilever stem beyond said base being between about 0.5 and 2.0 times the width of the base of the element, and said stem having a point of greatest spacing from said support, the length of the projection upon said support of the distal portion of said stem, beyond said point of greatest spacing, being less than about 0.25 times the width of said base.

16. The fastener component of claim 15 wherein the stem has a thickness that gradually decreases away from the base.

17. A molded fastener component comprising a field of fiber-engaging elements each secured to a support, at least one of the elements comprising a molded, cantilever stem secured to said support at a base, the stem projecting from the base, at an acute angle to the support, substantially linearly along a lengthwise axis to the region of a distal, crooked tip, the length of the projection upon said support of the portion of said cantilever stem extending beyond said base being between about 0.5 and 2.0 times the width of the base of the element, said stem having a point of greatest spacing from said support, the length of the projection upon said support of the distal portion of said stem, beyond said point of greatest spacing, being less than about 0.25 times the width of said base.

18. A fastener component, adapted to engage a corresponding loop component having fibers that effectively form loops with which crooks of the fastener components can engage, comprising a field of fiber-engaging elements secured to a support, the fiber-engaging elements being of molded form, each fiber-engaging element having a stem secured at its base to the support, and, at its outer end, at least one fiber-engaging crook that lies generally in a plane that includes the stem, the stem being sufficiently elongated, narrow and thin that it is characteristically twistable when subjected to lateral load, applied by a fiber of said loop component, in a direction transverse to said plane, to deflect the crook out of said plane to cause a component of the aspect of the crook to lie in the direction of the lateral load, thus enhancing the capability of the crook of the fastener to engage with loops when subjected to such lateral load, the thickness of the stem at an elevation corresponding to the lowest part of the distal end of the crook being about one-half the width of the distal end of the crook;

the fastener component comprising multiplicities of said fiber engaging elements disposed in corresponding rows, the planes of the stems and crooks of the elements extending in the direction of the respective rows.

19. The fastener component of claim 18 wherein said stem has a point of greatest spacing from said support, the length of the projection upon said support of the crook, beyond said point of greatest spacing, being less than about 0.25 times the width of the base of the stem.

20. The fastener component of claim 18 wherein the base of the stem has a width of between about 0.015 and 0.025 inch.

21. A fastener component comprising a field of fiber-engaging elements each secured to a support, at least one of the elements comprising a molded, cantilever stem secured to said support at a base having a width of between about 0.015 and 0.025 inch, the stem projecting from the base, at an acute angle between about 30 degrees and 45 degrees to the support, substantially linearly along a lengthwise axis to the region of a distal tip formed as a crook, the length of the projection upon said support of the portion of said cantilever stem extending beyond said base being between about 0.5 and 2.0 times the width of the base of the element.

22. The fastener component of claim 21 wherein the stem has a thickness at the base of between about 0.006 and 0.015 inch.

23. A fastener component comprising a field of fiber-engaging elements each secured to a support, at least one of the elements comprising a molded, cantilever stem secured to said support at a base and having a thickness that gradually decreases away from the base, the stem having one broad, substantially flat side and one convex side, the stem projecting from the base, at an acute angle between about 30 degrees and 45 degrees to the support, substantially linearly along a lengthwise axis to the region of a distal tip formed as a crook, the length of the projection upon said support of the portion of said cantilever stem extending beyond said base being between about 0.5 and 2.0 times the width of the base of the element.

24. A fastener component comprising a field of fiber-engaging elements each secured to a support, at least one of the elements comprising a molded, cantilever stem secured to said support at a base and having a thickness that gradually decreases away from the base, the stem having two convex sides, the stem projecting from the base, at an acute angle between about 30 degrees and 45 degrees to the support, substantially linearly along a lengthwise axis to the region of a distal tip formed as a crook, the length of the projection upon said support of the portion of said cantilever stem extending beyond said base being between about 0.5 and 2.0 times the width of the base of the element.

25. A fastener component comprising a field of fiber-engaging elements each secured to a support, at least one of the elements comprising a molded, cantilever stem secured to said support at a base, the stem projecting from the base, at an acute angle between about 30 degrees and 45 degrees to the support, substantially linearly along a lengthwise axis to the region of a distal tip formed as a crook, the length of the projection upon said support of the portion of said cantilever stem extending beyond said base being between about 0.5 and 2.0 times the width of the base of the element;

the field comprising a row of said elements, the row defining a spacing between adjacent elements along the row of more than about 1.5 times the width of the base of said element.

* * * * *

UNITED STATES PATENT AND TRADEMARK OFFICE
CERTIFICATE OF CORRECTION

PATENT NO. : 5,887,320
DATED : MARCH 30, 1999
INVENTOR(S) : GEORGE A. PROVOST

It is certified that error appears in the above-identified patent and that said Letters Patent is hereby corrected as shown below:

Under Inventor [75], please delete "Mass." and insert —New Hampshire—

Signed and Sealed this

First Day of May, 2001

Attest:

NICHOLAS P. GODICI

Attesting Officer    Acting Director of the United States Patent and Trademark Office